(12) United States Patent
Babiarz et al.

(10) Patent No.: US 7,122,743 B2
(45) Date of Patent: *Oct. 17, 2006

(54) SEAL FOR CABLES AND CONDUITS

(75) Inventors: Paul S. Babiarz, Liverpool, NY (US);
Scott Bowen, Fabius, NY (US); Paul V. Pace, Woburn, MA (US); Darren Loraas, Calgary (CA); Hans Haselbacher, Clay, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/035,411

(22) Filed: Jan. 14, 2005

(65) Prior Publication Data

US 2005/0263310 A1 Dec. 1, 2005

Related U.S. Application Data

(63) Continuation-in-part of application No. 10/695,651, filed on Oct. 29, 2003, now Pat. No. 6,852,930.

(51) Int. Cl.
*H02G 3/00* (2006.01)

(52) U.S. Cl. ............... 174/100; 174/101; 174/68.1; 174/665; 248/56

(58) Field of Classification Search ........... 174/100, 174/68.1, 65 R, 48, 101; 211/26; 248/56
See application file for complete search history.

(56) References Cited

U.S. PATENT DOCUMENTS

| 4,287,386 | A | | 9/1981 | Scahill et al. |
| 5,557,073 | A | | 9/1996 | Truesdale, Jr. et al. |
| 5,668,351 | A | | 9/1997 | Hanlon et al. |
| 6,329,599 | B1 | | 12/2001 | Zimmerman |
| 6,770,818 | B1 | * | 8/2004 | Puchegger ........ 174/100 |
| 6,838,622 | B1 | * | 1/2005 | Zuch ............ 174/100 |
| 6,965,080 | B1 | * | 11/2005 | Mixson ........... 174/75 D |

FOREIGN PATENT DOCUMENTS

GB 2094071 * 8/1982

OTHER PUBLICATIONS

International Search Report (4 pages).
Written Opinion of the International Searching Authority (3 pages).

* cited by examiner

*Primary Examiner*—Dhiru R. Patel
(74) *Attorney, Agent, or Firm*—Fish & Richardson P.C.

(57) ABSTRACT

Electrical conduits and conductors may be sealed using a chamber configured for attachment to a conduit through which at least one conductor runs such that the at least one conductor also runs through the chamber. A vent allows gas that enters the chamber from the conduit to exit the chamber. A sealing compound fills the chamber and surrounds the conductor and the vent.

20 Claims, 11 Drawing Sheets

SEAL FOR CABLES AND CONDUITS

CROSS-REFERENCE TO RELATED APPLICATION

This application is a continuation-in-part of and claims priority to U.S. application Ser. No. 10/695,651, filed on Oct. 29, 2003 now U.S. Pat. No. 6,852,930 and titled "Seal for Cables and Conduits," which is incorporated by reference in its entirety.

TECHNICAL FIELD

This document relates to a seal for cables and conduits.

BACKGROUND

A seal is typically used to prevent harmful fluids and vapors in a high-pressure process area from entering an electrical conduit that may leave the process area. If the seal fails, the harmful vapors may enter the electrical conduit and travel down the conduit to an unprotected location. The vapors may ignite in the unprotected location due to arcing or sparking.

SUMMARY

In one general aspect, electrical conduits and conductors may be sealed using a chamber configured for attachment to a conduit through which at least one conductor runs such that the at least one conductor also runs through the chamber. A vent allows gas that enters the chamber from the conduit to exit the chamber. A sealing compound fills the chamber and surrounds the conductor and the vent.

Implementations may include one or more of the following features. For example, a pressure relief tube may connect to the vent. The pressure relief tube may extend from the conduit to the vent such that the gas may pass from the conduit to the vent through the pressure relief tube.

The conductor may be a stranded conductor. A connector may connect the stranded conductor to a solid conductor. A second connector may connect the solid conductor to a second stranded conductor.

A plug, a pressure gauge that monitors vapor pressure within the vent, an explosion-proof drain, a breather, or a rupture disk may be attached to the vent.

The chamber may include a base and a cover that is threaded to screw onto the base. The cover may include a port that permits access to the chamber. The sealing compound may be injected into the chamber through the port.

The vent may include a tube that permits access to a portion of the chamber that is not filled with the sealing compound. The gas from the conduit may exit the chamber through the tube. The at least one conductor may run perpendicularly through the tube, or perpendicularly across an outer surface of the tube. The tube may include two interlocking halves between which the at least one conductor is placed.

The sealing compound may form an explosion-proof seal in the chamber.

In another general aspect, sealing electrical conduits and conductors includes attaching a chamber to a conduit to be sealed. At least one conductor runs through the conduit. A vent tube that opens to the outside of the chamber is mounted within the chamber. The at least one conductor is threaded though the chamber such that the at least one conductor contacts the vent tube. The chamber is covered with a cover, and a sealing compound is injected into the chamber.

Implementations may include one or more of the following features. For example, threading the at least one conductor though the chamber such that the at least one conductor contacts the vent tube may include threading the at least one conductor through the chamber such that the at least one conductor runs perpendicularly through the vent tube, or such that the at least one conductor runs perpendicularly across an outer surface of the vent tube.

One end of a pressure relief tube may be attached to the vent tube. An opposite end of the pressure relief tube may be placed within the conduit.

A plug, a pressure gauge, an explosion proof drain, a breather, or a rupture disk may be attached over an end of the vent tube on the outside of the chamber.

Mounting the vent tube in the chamber may include mounting a bottom half of the vent tube in the chamber. The at least one conductor may be passed across the bottom half of the vent tube, and a top half of the vent tube may be mounted in the chamber over the at least one conductor and the bottom half of the vent tube.

Covering the chamber with the cover may include screwing the cover onto the chamber. Putting the sealing compound in the chamber may include injecting the sealing compound into the chamber through a nozzle in the cover. A plug may be placed over the nozzle, and the sealing compound may be allowed to expand and harden.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A seal may be used to prevent migration of pressurized fluids and vapors down an electrical conduit. The conductors within the seal are separated by an expanding sealing compound that blocks movement of the vapors. The seal may also include a vent tube though which the vapors may exit the seal to a hazardous or classified location, or to a well vented area, such as the atmosphere. A pressure relief tube may guide the vapors from the electrical conduit to the vent tube. The seal also may include a pressure gauge or other mechanisms for containing, monitoring, or diverting the vapors within the seal.

Figure 1:
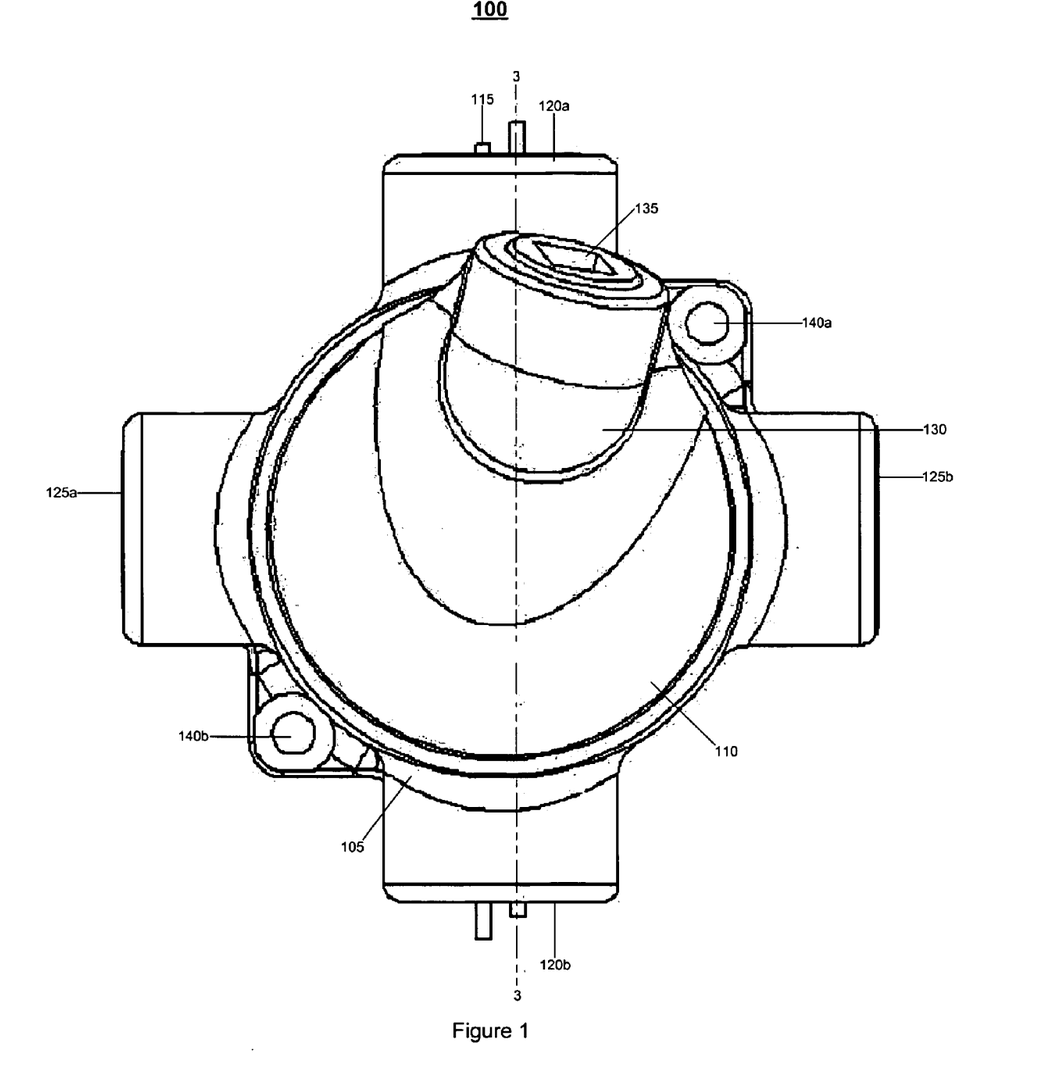
FIG. 1 is a schematic diagram of a first implementation of a seal.

Referring to FIG. 1, a first implementation of a seal 100 includes a base 105 and a cover 110 that may screw onto the base 105. The base 105 and the cover 110 may be made out of iron, aluminum, or any other suitable material. One or more conductors, such as the conductor 115, run through the base 105 of the seal 100. The conductor 115 enters and exits the base 105 through two conduit attachment points 120a and 120b that are located on opposite sides of the seal 100. The conduit attachment points 120a and 120b are threaded such that an electrical conduit containing the conductor 115 may be screwed into the base 105. The conduit attachment points 120a and 120b provide access to the center of the base 105 until a sealing compound is placed in the base 105.

The seal 100 may be used as a standalone, or primary, conduit seal, as a backup, or secondary, seal to a primary conduit seal, or as a drain seal. When the seal 100 is used as a secondary seal, conduits may be attached to each of the conduit attachment points 120a and 120b. When the seal 100 is used as a primary seal, a conduit may be attached to one of the conduit attachment points 120a and 120b, while the other of the conduit attachment points 120a and 120b is directly connected to a process area. For ease of discussion, the following description assumes that the seal 100 is being used as a secondary seal.

Two venting points 125a and 125b provide access to the center of the base 105 even after the sealing compound has been placed in the base 105. As illustrated below with reference to FIG. 2, a vent tube connecting the two venting points 125a and 125b is perpendicular to a line extending between the two conduit attachment points 120a and 120b. The venting points 125a and 125b may be blocked with plugs to prevent fluids and vapors from exiting the seal 100. In addition, a pressure gauge may be attached to one of the venting points 125a and 125b to measure the pressure within the seal 100. The pressure gauge also may be positioned entirely within the vent tube, and may be accessed through conductors that extend out of one of the conduit attachment points 120a and 120b. An explosion-proof drain, a breather, or a rupture disk also may be attached to the venting points 125a and 125b. Additional pipes or conduits that lead to the outside atmosphere also may be attached to the venting points 125a and 125b. The additional pipes or conduits may lead to additional seals that lead to the outside atmosphere such that multiple seals are connected in series.

A nozzle 130 extends from the top of the cover 110 and permits access to the center of the base 105 through an access port 135. The access port 135 and the nozzle 130 are used to inject the sealing compound into the base 105. The access port 135 may be blocked with a plug to prevent access to the inside of the seal 100 once the sealing compound has been injected into the base 105. Since the sealing compound expands upon being injected into the base 105, the plug may also serve to prevent the sealing compound from exiting the base when the sealing compound expands. The seal 100 can be attached to a surface with fasteners, such as screws, that extend through a pair of attachment points 140a and 140b.

Figure 2:
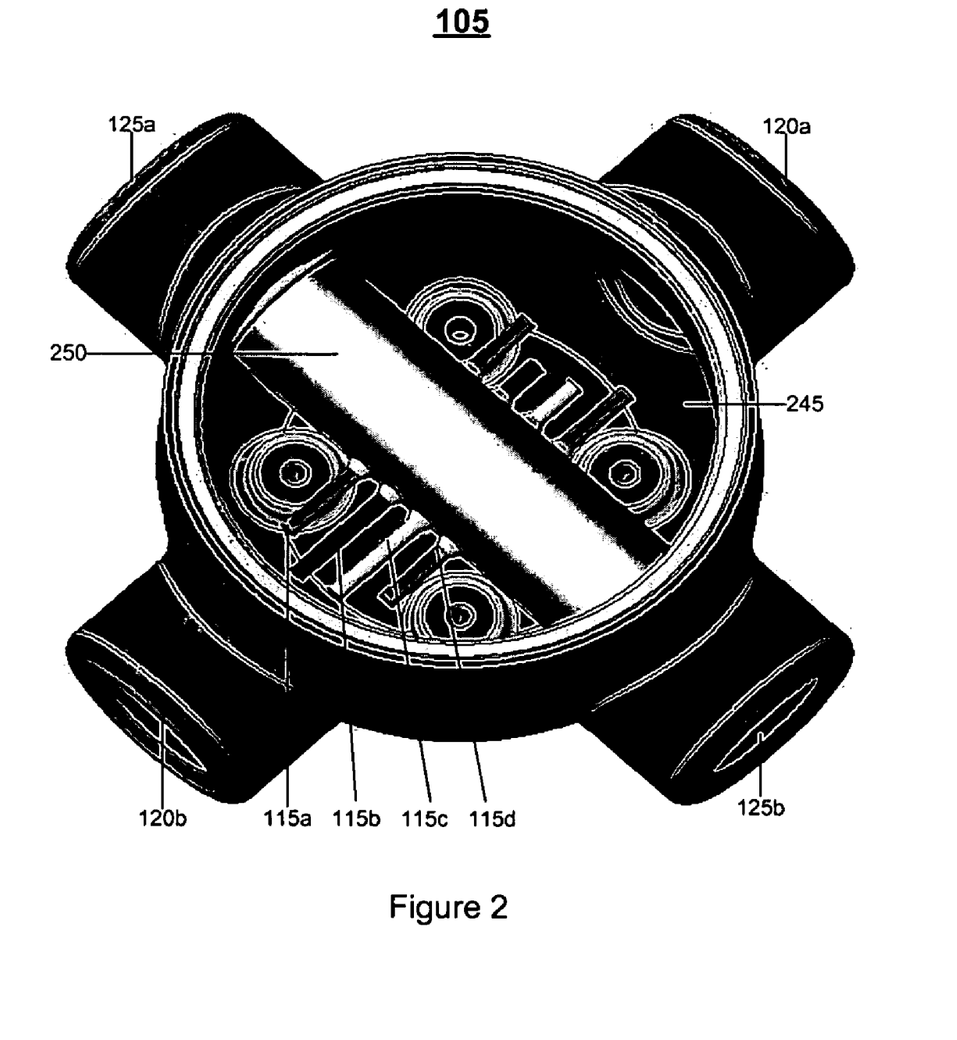
FIG. 2 is a perspective illustration of a base from the seal of FIG. 1.

Referring to FIG. 2, one implementation of the base 105 of a seal 100 may accommodate one or more conductors, such as the conductors 115a–115d, for the purpose of sealing an electrical conduit containing those conductors from harmful vapors. The conductors 115a–115d enter and exit the base 105 through the conduit attachment points 120a and 120b, where the electrical conduits that contain the conductors 115a–115d are attached to the base 105.

The seal 100 prevents the migration of harmful vapors from a conduit attached to one of the conduit attachment points 120a and 120b to a conduit attached to the other of the conduit attachment points 120a and 120b. To this end, a sealing chamber 245 within the base 105 is filled with the sealing compound to prevent harmful vapors from entering the seal 100 at one of the conduit attachment points 120a and 120b and exiting at the other of the conduit attachment points 120a and 120b.

The venting points 125a and 125b do not provide access to the sealing chamber 245. Instead, the venting points 125a and 125b attach to the opposite ends of a vent tube 250. Any vapors or fluids that enter the seal 100 may enter the vent tube 250. After entering the vent tube 250, the vapors may exit the seal 100 through the venting points 125a and 125b, if the venting points 125a and 125b are not capped. If the venting points are capped, vapors entering the vent tube 250 may be detected using a pressure gauge positioned within or connected to the vent tube 250.

Figure 3:
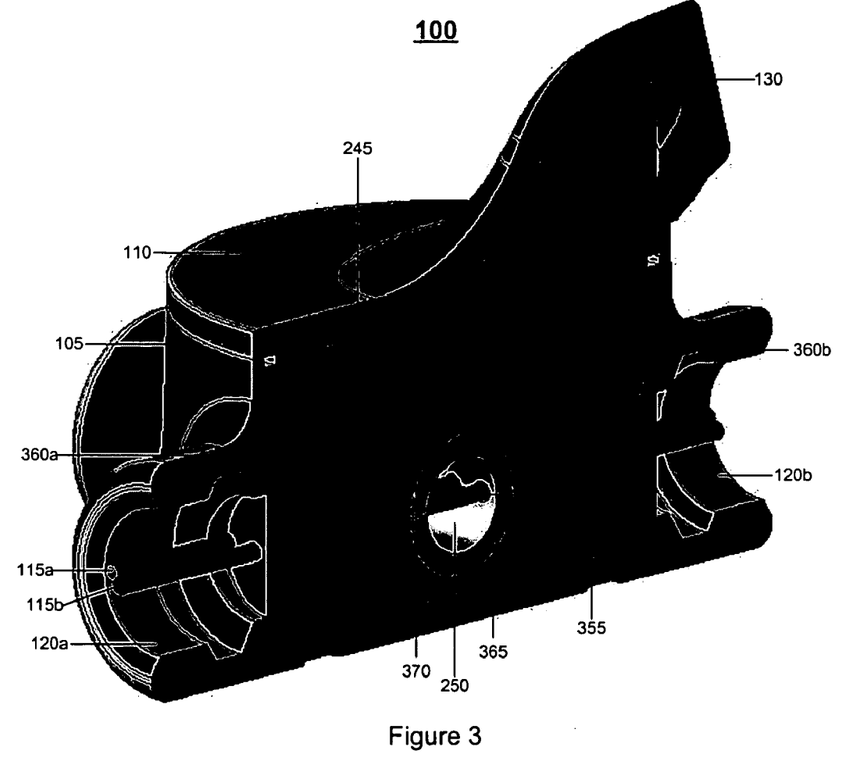
FIG. 3 is a cross section of the seal of FIG. 1 taken along section 3—3 of FIG. 1.

Referring to FIG. 3, a cross sectional view of the seal 100 taken along section 3—3 reveals the inner configuration of the seal 100. The base 105 and the cover 110 are placed together to form the chamber 245 through which conductors 115a and 115b extend.

The nozzle 130 on the cover 110 of the seal 100 is used to inject the sealing compound 355 into the base 105. As shown, the sealing compound 355 has been allowed to expand and harden within the base 105 and the cover 110 of the secondary process seal 100. In one implementation, the sealing compound 355 is a two-part mixture that starts to expand once the two parts are mixed. The sealing compound 355 expands to approximately four times its size immediately after being mixed. As expansion occurs, the sealing compound 355 moves between the conductors 115a and 115b to prevent the conductors 115a and 115b from touching each other or the sides of the base 105. The cover 110 may be screwed onto the base 105 to hold the base 105 and the cover 110 together to confine the expanding sealing compound 355 within the sealing chamber 245. At full expansion, the sealing compound 355 extends within the base 105 approximately to the hub stops 360a and 360b at the edge of the base 105.

In one implementation, the sealing compound 355 is provided in a self-contained mixing and applying cartridge. The two parts or materials of the sealing compound 355 are separated by a barrier, such as a foil barrier, partway between a top and bottom of the cartridge. A mixing rod is coupled to a plunger within the cartridge. After the barrier between the two materials is broken, the plunger is moved up and down within the cartridge with the mixing rod to combine the two materials. After the two materials have been mixed, a nozzle is attached to the cartridge, and the mixing rod is used to force the mixed sealing compound 355 out of the cartridge through the nozzle. The nozzle is placed in the access port 135 of the nozzle 130 of the cover 110 so that the sealing compound may be injected into the base 105. A plug is quickly placed over the access port 135 of the nozzle 130 to prevent the sealing compound from expanding outside of the chamber 245.

In one implementation, the sealing compound 355 is Chem-Cast 637 sealing foam that includes Chem-Cast 637 isoocyanate and Chem-Cast 637 polyol. Isocyanate is a dark brown liquid that is insoluble in water with a boiling point of 392° F. (200° C.), a vapor density of 0.00016 (mm Hg), and a specific gravity of 1.2 g/mL. Polyol is a gray liquid, partially soluble in water with a specific gravity of 1.05 g/mL. When mixed together, the resultant material is gray in color and has a rise time of 1.5–2.5 minutes and a gel time of 4–5 minutes. When fully cured, the foam density is 15–20 lb/ft$^3$. The compression strength is greater than 60 psi, the porosity is greater than 90% closed cell, and the water absorption is less than 1%.

Chem-Cast 637 is a fire resistant two-part rigid polyurethane foam that expands to form a dense, high strength foam and has excellent adhesion to many surfaces without the use of primers. The sealing compound 355 should be held between 4° C. and 29° C. The sealing compound 355 may be used in various hazardous areas, including Class I, Division 1 & 2, Groups A., B, C, .D and Class I, Zones 0, 1, & 2. Chem-Cast 637 is available from Chemque, Inc. of Indianapolis, Ind.

In further implementations, the sealing compound 355 may be a single material that may start expanding at a controlled time, such as by exposure to air or other gases or by electrical stimulation, heat or any other controllable event.

Since the sealing compound 355 does not enter the vent tube 250, the vent tube 250 provides a port through which any vapors that pass through the conductors 115a and 115b may escape. The vent tube 250 includes a lower half 365 and an upper half 370. The conductors 115a and 115b fit through openings defined between the lower half 365 and the upper half 370 of the vent tube 250.

During assembly and installation of the seal 100, the lower half 365 is placed in the base 105 and the conductors 115a and 115b are placed across the lower half 365. The upper half 370 then is placed over the lower half 365 and the conductors 115a and 115b to form the vent tube 250. The cover 110 then is screwed onto the base 105 and the sealing compound 355 is injected to complete the seal 100.

Figure 4:
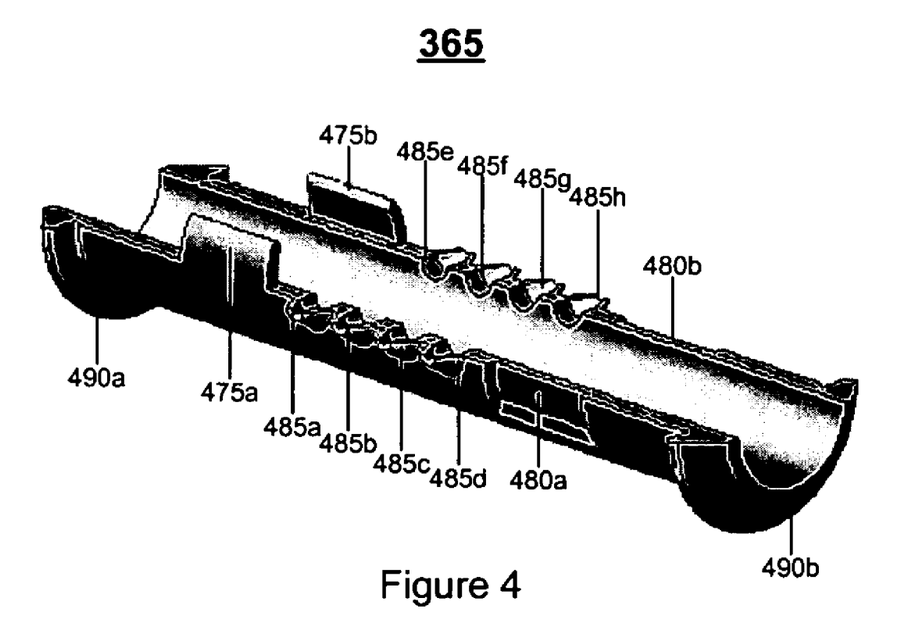
FIG. 4 is a perspective illustration of half of a vent tube from the seal of FIG. 1.

Referring to FIG. 4, tube half 365, which is identical to tube half 370, includes a pair of teeth 475a and 475b near one end that mate with a pair of indentations 480a and 480b near the opposite end of the other tube half. A snap fit between the teeth 475a and 475b and the indentations 480a and 480b holds the two halves 365 and 370 together to form the cylindrical vent tube 250.

The tube half 365 also includes notches 485a–485h between the teeth and the indentations. More particularly, the notches 485a–485d are on one side of the tube half 365, and the notches 485e–485h are on an opposite side of the tube half 365. The notches 485a–485h form holes through which the conductors 115a and 115b pass when combined with notches from the tube half 370. For example, one of the conductors may pass through a hole formed by the notches 485a and 485e and corresponding notches from the tube half 370.

Each half 365 of the vent tube 250 also includes tapered ends 490a and 490b that fit into the venting points 125a and 125b. The sealing compound may not form a tight seal against the conductors. Instead, there may be a small gap between the sealing compound and the conductor through which vapors can flow. As a result, the vapors may move from the electrical conduit and into the seal 100 along the path of the conductors 115a and 115b. As a result, the vapors may enter the vent tube 250 with the conductors through the holes formed by the notches 485a–485h from the lower half 365 and corresponding notches from the upper half 370 of the vent tube 250. The vapors exit the vent tube 250 through the venting points 125a and 125b rather than the holes formed by the notches 485a–485h and the corresponding notches because there is less resistance to flow out of the venting points 125a and 125b than to flow through any gaps defined between the conductors and the notches 485a–485h or the sealing compound.

Figure 5:
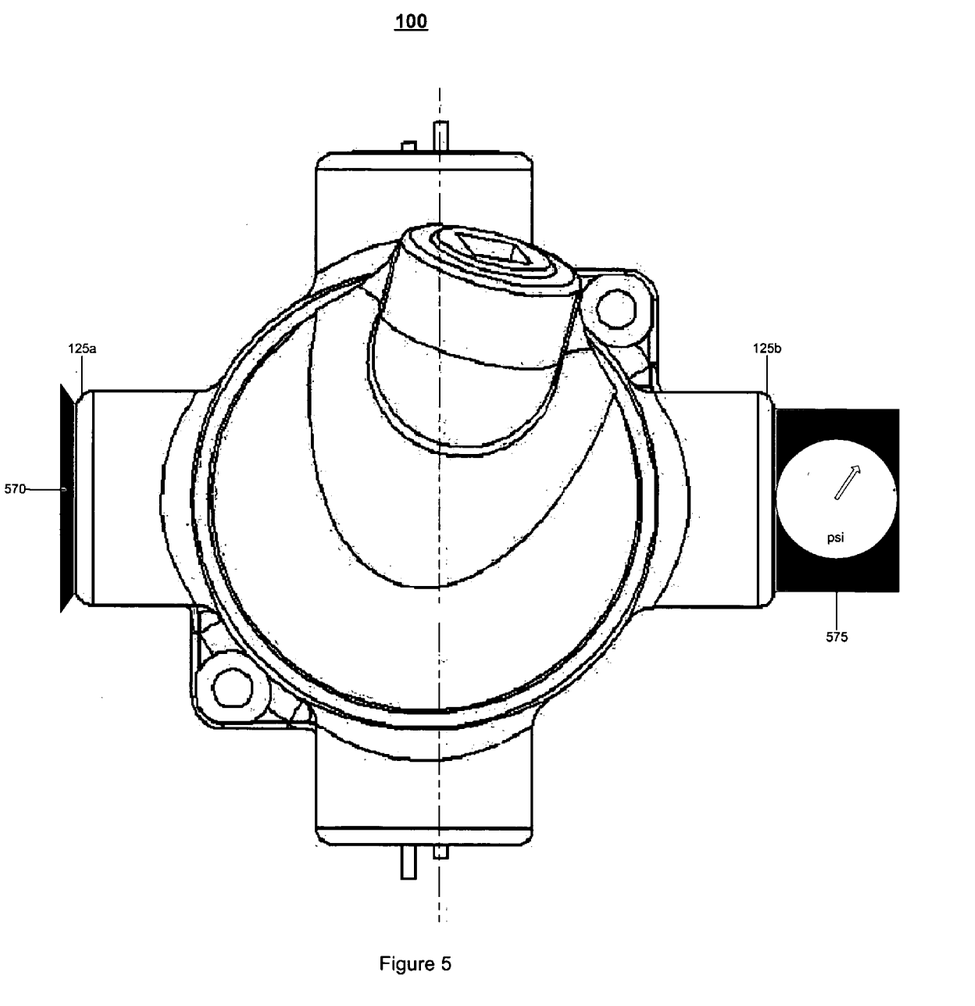
FIG. 5 is a diagram of a pressure gauge attached to the seal of FIG. 1

Referring to FIG. 5, a seal 100 may have a plug 570 or a pressure gauge 575, an explosion-proof drain, a breather, a rupture disk, or a tube leading to a well vented area installed in the venting points 125a and 125b. When simultaneously installed in both venting points 125a and 125b, the plug 570 and the pressure gauge 575 block any vapors that enter the vent tube 250, which connects to the venting points 125a and 125b, from exiting the seal 100. The pressure gauge 575 also measures the pressure inside the seal 250. Alternatively or additionally, a pressure gauge could be installed entirely within the vent tube 250, and the venting points 125a and 125b could both be blocked with plugs 570. In this case, the pressure gauge 575 may be accessed through conductors that extend out of one of the conduit attachment points 120a and 120b.

Figure 6:
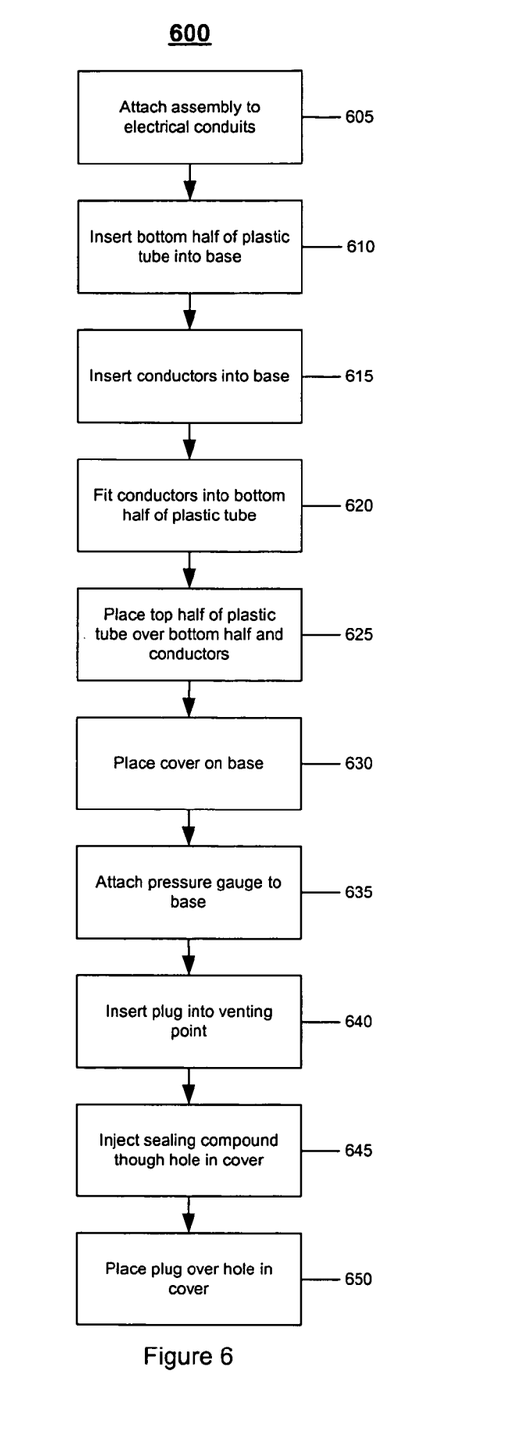
FIG. 6 is a flow chart of a process for assembling the seal of FIG. 1.

Referring to FIG. 6, an assembly process 600 is used to assemble a seal, such as the seal 100 of FIG. 1. The assembly process 600 allows for a quick and simple installation of the seal for protection against leakage of harmful fluids and vapors into electrical conduits. To ensure a proper fit, a base of the seal is attached to an electrical conduit to be sealed (605). The conduit may be attached by the base by screwing the conduit into a threaded conduit attachment point of the base, such as one of the conduit attachment points 120a and 120b of FIGS. 1–3.

A bottom half of a vent tube into the base of the seal (610). One or more conductors that run through the conduit are threaded through one of the conduit attachment points in the base and are brought into the center of the base (615). The conductors are fit into the notches in the bottom half of the vent tube and are taken out of the base through a second conduit attachment point in the base (620).

The top half of the vent tube then is placed over the bottom half of the vent tube and the conductors (625). Notches in the top half of the vent tube line up with notches in the bottom half and fit over the conductors. The top half is snapped together with the bottom half to create the vent tube. Placing the two halves of the vent tube together holds the conductors in place within the base and provides a pathway for the vapors to leave the secondary process seal.

A cover is placed over the base (630). The cover may be screwed onto the base to hold the base and the cover together. A pressure gauge is attached to the base (635). The pressure gauge attaches to one of the venting points on the outside of the base, or it may be placed within the vent tube. A plug may also be inserted into a venting point to prevent the vapors from exiting the base (640).

A sealing compound is injected into the base through a hole in the cover (645). Immediately after the sealing compound is injected into the base, a plug is placed into the hole in the cover to contain the sealing compound as it expands to fill the inside of the base (650). When expanded and hardened, the sealing compound forms an explosion-proof seal that prevents the migration of vapors down the conduits to which the seal is attached.

Figure 7:
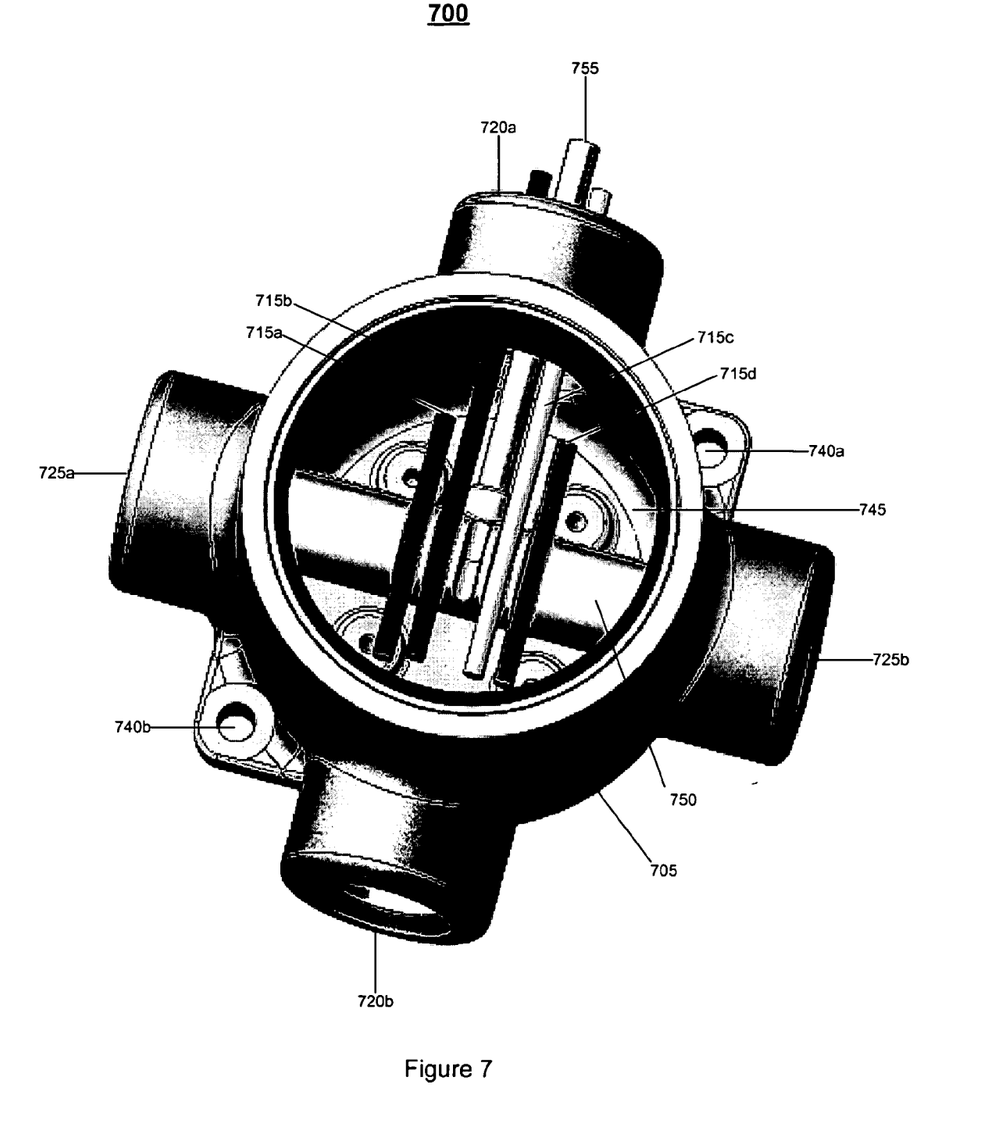
FIG. 7 is a perspective illustration of a base from a second implementation of a seal.
Figure 8:
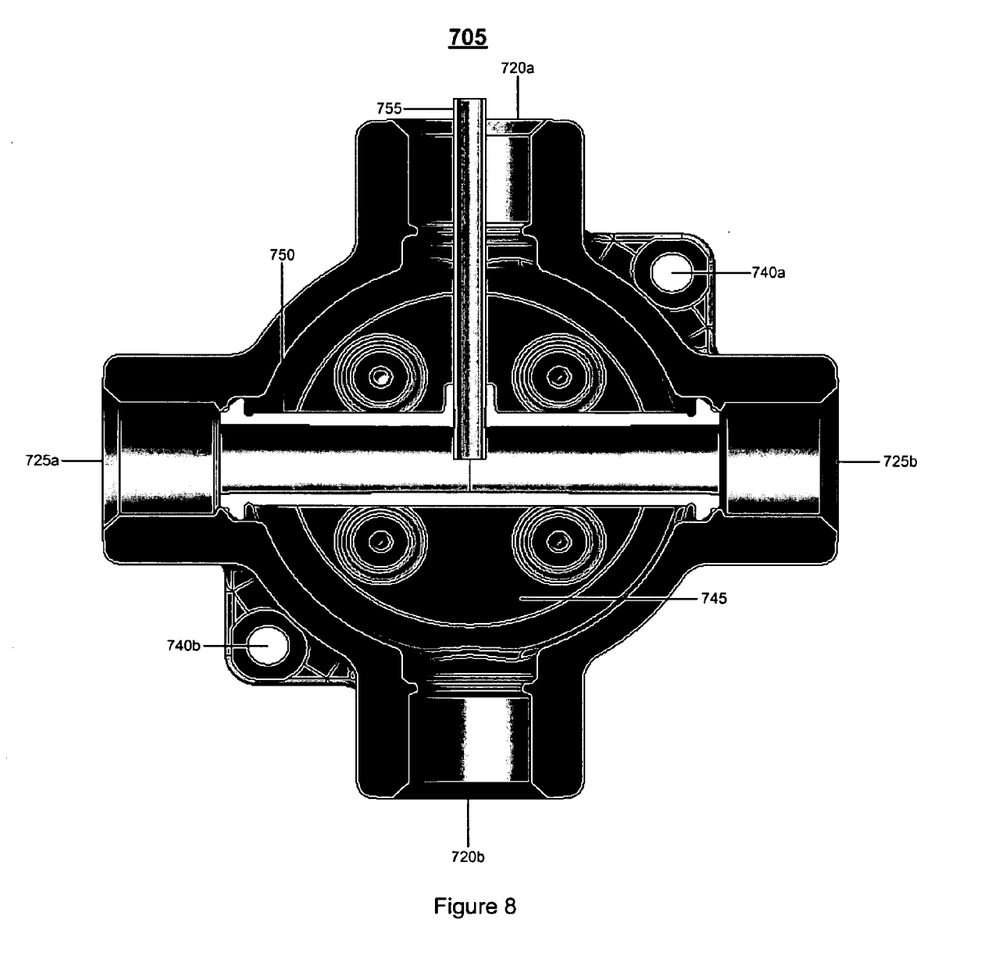
FIG. 8 is a cross section of the base of FIG. 7.

Referring to FIGS. 7 and 8, a second implementation of a seal 700 also includes a base 705 and a cover (not shown). The base 705 is similar to the base 105 of FIG. 1, and the cover is similar to the cover 110 of FIG. 1. Conductors 715a–715d, which are similar to the conductors 115a–15d of FIGS. 1–3, run through the base 705 of the seal 700. The base 705 includes conduit attachment points 720a and 720b, venting points 725*a* and 725*b*, and attachment points 740*a* and 740*b*, all of which are similar to the corresponding components of the seal 100 of FIG. 1. The base 705 and the cover form a sealing chamber 745 that is similar to the sealing chamber 245 of FIG. 2. A sealing compound that is similar to the sealing compound 355 of FIG. 3 is injected into the chamber 745 through a port in the cover. The base 705 also includes a vent tube 750 and a pressure relief tube 755 that enable harmful fluids or vapors that enter the seal 700 to be vented from the seal 700. Plugs, pressure gauges, explosion proof-drains, breathers, rupture disks, or pipes that lead to the outside atmosphere may be attached to the venting points 725*a* and 725*b* to monitor, contain, or divert the harmful fluids or vapors.

Figure 9:
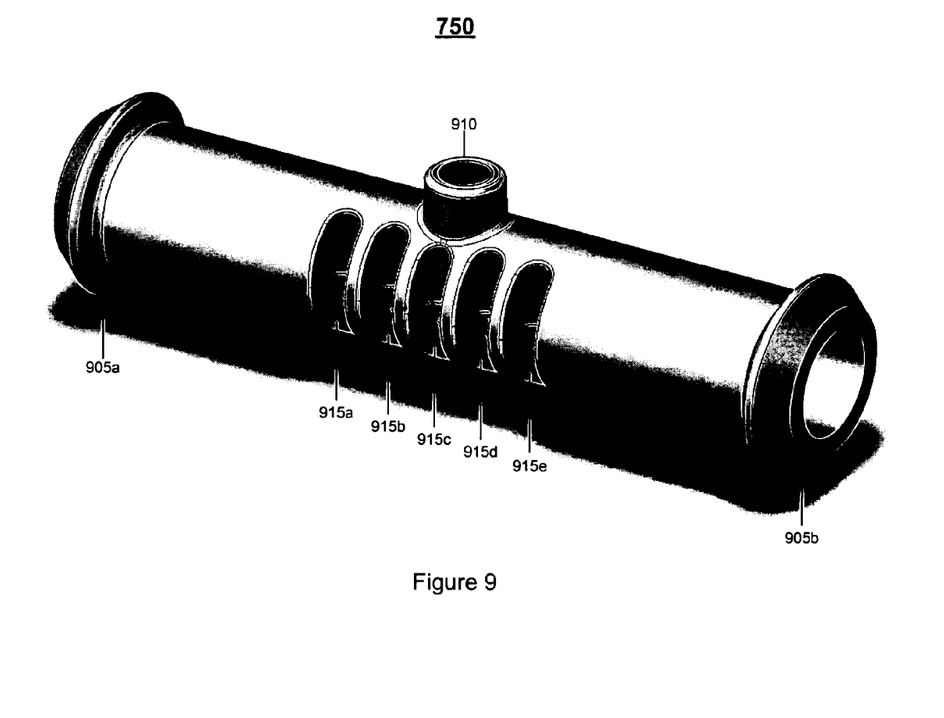
FIG. 9 is a perspective illustration of a vent tube from the base of FIG. 7.

Referring also to FIG. 9, the vent tube 750 includes tapered ends 905*a* and 905*b*, a port 910, and wire wells 915*a*–915*e*. The vent tube 750 may include a single component or multiple interlocking components. The vent tube 750 may be made of plastic or a flexible material, such as silicone rubber.

The tapered ends 905*a* and 905*b* fit into the venting points 725*a* and 725*b*, thereby connecting the vent tube 750 to the venting points 725*a* and 725*b*. As a result, harmful vapors or fluids that enter the vent tube 750 may exit the seal 700 through the venting points 725*a* and 725*b*.

The harmful fluids or vapors enter the vent tube 750 through the port 910, which leads to the interior of the vent tube 750. The pressure relief tube 755 connects to the vent tube 750 through the port 910. The pressure relief tube 755 extends out of the seal 700 and into an electrical conduit connected to the seal 700 at one of the conduit attachment points 720*a* and 720*b*. As a result, pressurized fluids within the conduit may enter the pressure relief tube 755, and the fluids may flow through the pressure relief tube 755 to the vent tube 750 through the port 910. The fluids exit the vent tube 750 through the venting points 725*a* and 725*b* rather than through the port 910 because there is less resistance to flow out of the venting points 725*a* and 725*b* than to flow through the port 910. The pressure relief tube 755 may be made of plastic or a flexible material, such as silicone rubber. The port 910 may be tapered to create a tight fit between the vent tube 750 and the pressure relief tube 755.

The conductors 715*a*–715*d* run across the vent tube 750 and fit into the wire wells 915*a*–915*e*. The wire wells 915*a*–915*e* are indentations that are molded into an outer surface of the vent tube 750. The wire wells 915*a*–915*e* extend perpendicularly across the vent tube 750 such that the conductors 715*a*–715*d* may be placed within the wire wells 915*a*–915*e*. The vent tube 750 may be oriented within the base 705 such that the wire wells 915*a*–915*e* are located near the cover of the seal 700. The wire wells 915*a*–915*e* organize and provide spaces between the conductors 715*a*–715*d* within the seal 700.

Figure 10:
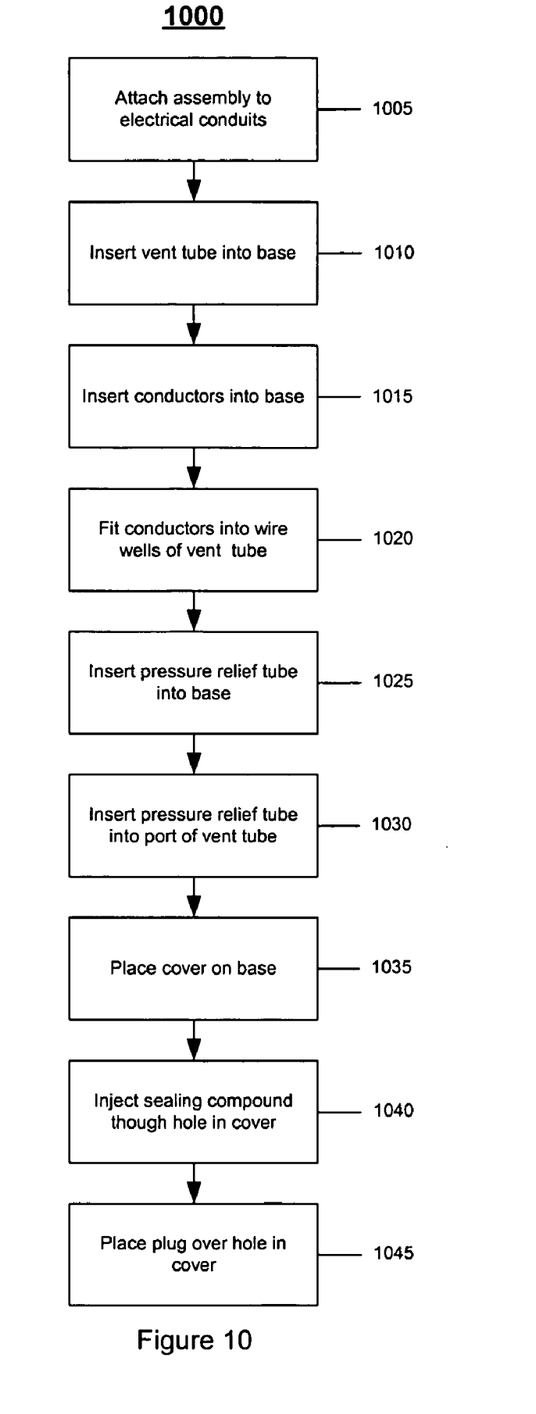
FIG. 10 is a flow chart of a process for assembling the second implementation of the seal of FIG. 7.

Referring to FIG. 10, an assembly process 1000 is used to assemble a seal, such as the seal 700 of FIG. 7. The process 1000 is similar to the process 600 of FIG. 6. The process 1000 begins when a base of the seal assembly is attached to an electrical conduit to be sealed (1005). The conduit may be attached by the base by screwing the conduit into a threaded conduit attachment point of the base, such as one of the conduit attachment points 720*a* and 720*b* of FIGS. 7 and 8.

A vent tube, such as the vent tube 750 of FIGS. 7 and 9, is inserted into the base of the seal, such as the base 705 of FIG. 7 (1010). The vent tube may be inserted into the base such that tapered ends of the vent tube, such as the tapered ends 905*a* and 905*b* of FIG. 9, fit into venting points of the base, such as the venting points 725*a* and 725*b* of FIG. 7. Furthermore, the vent tube may be oriented such that wire wells of the base, such as the wire wells 915*a*–915*e*, are located near an opening of the base over which a cover may be placed.

One or more conductors that run through the conduit are threaded through a conduit attachment point of the base, such as one of the conduit attachment points 720*a* and 720*b* of FIG. 7. As a result, the conductors are brought into the center of the base (1015). The conductors are brought across the top of the vent tube and are fit into the wire wells of the vent tube (1020). The conductors are threaded through a second conduit attachment point out of the base.

A pressure relief tube, such as the pressure relief tube 755 of FIG. 7 is inserted into the base (1025). The pressure relief tube may be inserted into the base through the same conduit attachment point through which the conductors were inserted into the base. Alternatively, the pressure relief tube may be inserted into the base through the opening over which the cover may be placed. Harmful fluids and vapors from the conduit to which the seal is to be attached may enter the pressure relief tube. To enable venting of the harmful fluids and vapors that may enter the pressure relief tube, one end of the pressure relief tube is inserted into a port of the vent tube (1030). As a result of the orientation of the vent tube, the port may point towards the conduit attachment point at which the conduit is attached to the seal. An opposite end of the pressure relief tube may be inserted into the conduit through the conduit attachment point.

The cover is placed over the base (1035). The cover may be screwed onto the base to hold the base and the cover together. Plugs, pressure gauges, or other mechanisms for containing, monitoring, or diverting the harmful fluids may be attached to the venting points of the base. Alternatively or additionally, one or more pressure gauges may be placed entirely within the vent tube.

A sealing compound is injected into the base through a hole in the cover (1040). Immediately after the sealing compound is injected into the base, a plug is placed into the hole in the cover to contain the sealing compound as it expands to fill the inside of the base (1045). When expanded and hardened, the sealing compound forms an explosion-proof seal that prevents the migration of vapors down the conduits to which the seal is attached.

Figure 11:
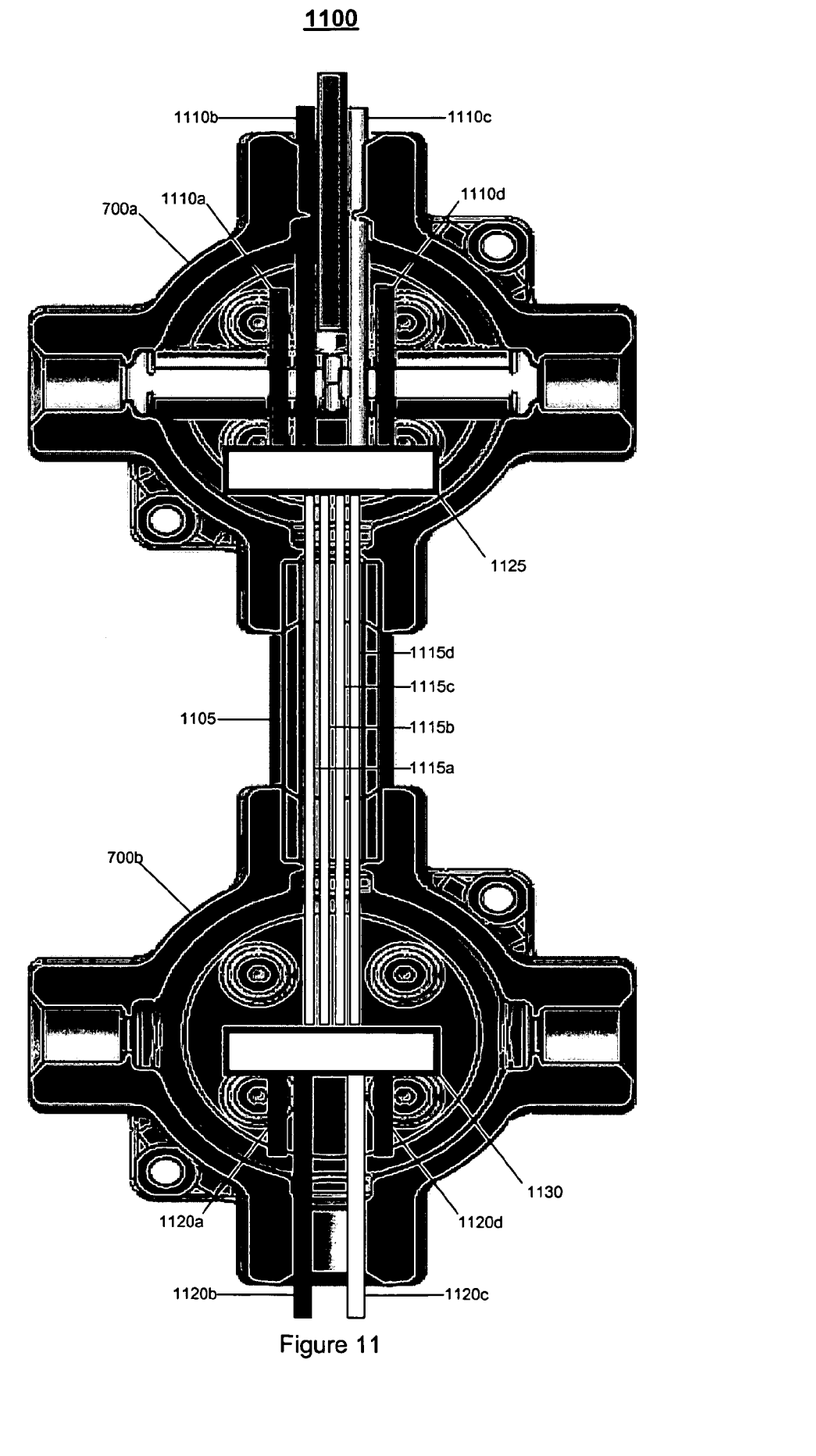
FIG. 11 is an illustration of a system for sealing stranded conductors with solid conductors.

Referring to FIG. 11, an electrical system 1100 may include multiple seals 700*a* and 700*b*. The seals 700*a* and 700*b* are connected by a conduit 1105. Stranded conductors 1110*a*–1110*d* run into the seal 700*a*. Solid conductors 1115*a*–1115*d* run between the seals 700*a* and 700*b*. Stranded conductors 1120*a*–1120*d* run out of the seal 700*b*. A connector 1125 connects the stranded conductors 1110*a*–1110*d* to the solid conductors 1115*a*–1115*d*. A connector 1130 connects the solid conductors 1115*a*–1115*d* to the stranded conductors 1120*a*–1120*d*. For ease of description, it is assumed that the electrical system 1100 is oriented such that electricity flows from the stranded conductors 1110*a*–1110*d* through the solid conductors 1115*a*–1115*d* to the stranded conductors 1120*a*–1120*d*.

The conduit 1105 is screwed into a conduit attachment point of each of the seals 700*a* and 700*b*. The solid conductors 1115*a*–1115 *d* are threaded through the conduit 1105. In some implementations, a sealing compound that is similar to the sealing compound injected into the chambers of the seals 100 of FIG. 1 and 700 of FIG. 7 is injected into the conduit 1105 after the solid conductors 1115*a*–1115*d* have been threaded through the conduit 1105.

Each of the stranded conductors 1110*a*–1110*d* and 1120*a*–1120*d* includes a bundle of individual conductors surrounded by insulation. Typically, the insulation is removed from the ends of the stranded conductors 1110a–1110d and 1120a–1120d to permit electrical connection to the stranded conductors 1110a–1110d and 1120a–1120d. As a result, harmful vapors may enter the stranded conductors 1110a–1110d and 1120a–1120d and may occupy the spaces between the individual conductors of the stranded conductors 1110a–1110d and 1120a–1120d. Such vapors may not be vented from the seals 700a and 700b because the vapors are prevented from entering pressure relief tubes of the seals 700a–700b by the insulation surrounding the stranded conductors 1110a–1110d and 1120a–1120d. As a result, the vapors may travel the entire length of the stranded conductors 1110a–1110d and 1120a–1120d.

By contrast, each of the solid conductors 1115a–1115d is a single conductor surrounded by insulation. As a result, the solid conductors 1115a–1115d do not include any interstitial space through which harmful vapors may flow.

The connector 1125 connects the stranded conductors 1110a–1110d to the solid conductors 1115a–1115d within the seal 700a such that any vapors flowing through the stranded conductors 1110a–1110d do not exit the seal 700a. If the stranded conductors 1110a–1110d were allowed to run completely through the seal 700a, then vapors within the seal would be enabled to flow through the seal 700a towards the seal 700b. Connecting the stranded conductors 1110a–1110d and the solid conductors 1115a–1115d with the connector 1125 allows electricity to flow through the seal 700a on the conductors 1110a–1110d and 1115a–1115d while harmful vapors are prevented from exiting the seal.

In one implementation, the connector 1125 connects the stranded conductors 1110a–1110d, respectively, by sealing the ends of the stranded conductors 1110a–1110d. For example, the connector 1125 may represent soldered connections between the ends of the stranded conductors 1110a–1110d and the ends of the solid conductors 1115a–1115d within the seal. Soldering the ends of the stranded conductors 1110a–1110d also seals the ends of the stranded conductors 1110a–1110d, which prevents vapors that are flowing through the stranded conductors 1110a–1110d from exiting the stranded conductors 1110a–1110d within the seal 700a.

In another implementation, the connector 1125 may represent pigtail connections between the stranded conductors 1110a–1110d and the solid conductors 1115a–1115d. In such a connection, ends of a stranded conductor and a solid conductor are twisted together, and a cap is placed over the twisted portion of the conductors. The cap includes a heat shrink and solder. When the pigtail connection is heated, the heat shrink collapses, and the solder melts, thereby making a solid core to seal the conductors. In other implementations, the connector 1125 may represent a terminal block, twist-on or screw-on connectors, or other connectors.

The connector 1130 connects the solid conductors 1115a–1115d to the stranded conductors 1120a–1120d within the seal 700b. As a result, stranded conductors both enter and exit the electrical system 1100. The connector 1130 may connect the solid conductors 1115a–1115d to the stranded conductors 1120a–1120d in a manner similar to how the connector 1125 connects the stranded conductors 1110a–1110d to the solid conductors 1115a–1115d.

The seal 700a vents harmful vapors flowing down a conduit that includes the stranded conductors 1110a–1110d that are not flowing through the stranded conductors 1110a–1110d. Vapors flowing through the stranded conductors 1110a–1110d encounter the connector 1125. As a result, the vapors are blocked from exiting the ends of the stranded conductors 1110a–1110d that are within the seal 700a. Therefore, vapors may be trapped within the stranded conductors 1110a–1110d. Vapors may continue to enter the stranded conductors 1110a–1110d at ends of the stranded conductors 1110a–1110d that are within the conduit, thereby increasing the vapor pressure within the stranded conductors 1110a–1110d. Once the vapor pressure reaches a threshold value, further vapors will not enter the stranded conductors 1110a–1110d. Instead, those vapors flow down the conduit and are vented through the vent tube and the pressure relief tube.

Because harmful vapors from the solid conductors 1110a–1110d may not flow through the solid conductors 1115a–1115d, and because other harmful vapors flowing into the seal 700a are vented by the seal 700a, no harmful vapors flow into the seal 700b. As a result, the seal 700b need not include a vent tube and sealing compound to vent vapors within the seal 700b. In fact, the seal 700b may act simply as a housing for the connector 1130. In some implementations the connector 1130 may be included in the seal 700a, thereby eliminating the need for the seal 700b. In other implementations, the electrical system may include other housings for the connector 1130 that are separate from the seal 700.

In some implementations, rather than connecting stranded conductors to solid conductors to prevent vapors from flowing through the conductors, the spaces through which the vapors may flow at the ends of the conductors may be filled. For example, the spaces at the ends of the stranded conductors may be filled with a plastic, metal, or semi-metallic compound. In such implementations, the conductors 1115a–1115d and 1120a–1120d and the connectors 1125 and 1130 are not required, and the stranded conductors 1110a–1110d may flow entirely through the electrical system 1100.

Electrical conduits are used throughout as an example of a tube through which conductors may pass into a seal. In other implementations, other pipes, tubes, or conduits may be used. For example, the conductors may run into the seal through a cable gland or through a sealing gland.

A number of implementations have been described. Nevertheless, it will be understood that various modifications may be made. For example, the steps in the described process may be performed in a different order, or the seal may be modified to include only a single venting point. Accordingly, other implementations are within the scope of the following claims.

What is claimed is:

1. A system for sealing electrical conduits and conductors, the system comprising:
    a chamber configured for attachment to a conduit through which at least one conductor runs such that the at least one conductor also runs through the chamber;
    a vent through which gas that enters the chamber from the conduit may exit the chamber; and
    a sealing compound that fills the chamber and surrounds the conductor and the vent.

2. The system of claim 1 further comprising a pressure relief tube that connects to the vent, wherein the pressure relief tube extends from the conduit to the vent such that the gas may pass from the conduit to the vent through the pressure relief tube.

3. The system of claim 1 further comprising:
    a connector; and
    a solid conductor, wherein the conductor is a stranded conductor and the connector connects the stranded conductor to the solid conductor.

4. The system of claim 3 further comprising:
a second stranded conductor; and
a second connector that connects the solid conductor to the second stranded conductor.

5. The system of claim 1 wherein a plug, a pressure gauge that monitors vapor pressure within the vent, an explosion-proof drain, a breather, or a rupture disk is attached to the vent.

6. The system of claim 1 wherein the chamber includes a base and a cover that is threaded to screw onto the base.

7. The system claim 1 wherein the cover includes a port that permits access to the chamber, wherein the sealing compound is injected into the chamber through the port.

8. The system of claim 1 wherein the vent comprises a tube that permits access to a portion of the chamber that is not filled with the sealing compound, wherein the gas from the conduit exits the chamber through the tube.

9. The system of claim 8 wherein the at least one conductor runs perpendicularly through the tube.

10. The system of claim 8 wherein the at least one conductor runs perpendicularly across an outer surface of the tube.

11. The system of claim 8 wherein the tube includes two interlocking halves between which the at least one conductor is placed.

12. The system of claim 1 wherein the sealing compound forms an explosion-proof seal in the chamber.

13. A method for sealing electrical conduits and conductors, the method comprising:
attaching a chamber to a conduit to be sealed, at least one conductor running through the conduit;
mounting a vent tube that opens to the outside of the chamber within the chamber;
threading the at least one conductor though the chamber such that the at least one conductor contacts the vent tube;
covering the chamber with a cover; and
injecting a sealing compound into the chamber.

14. The method of claim 13 wherein threading the at least one conductor though the chamber such that the at least one conductor contacts the vent tube comprises threading the at least one conductor through the chamber such that the at least one conductor runs perpendicularly through the vent tube.

15. The method of claim 13 wherein threading the at least one conductor though the chamber such that the at least one conductor contacts the vent tube comprises threading the at least one conductor through the chamber such that the at least one conductor runs perpendicularly across an outer surface of the vent tube.

16. The method of claim 13 further comprising:
attaching one end of a pressure relief tube to the vent tube; and
placing an opposite end of the pressure relief tube within the conduit.

17. The method of claim 13 further comprising attaching a plug, a pressure gauge, an explosion proof drain, a breather, or a rupture disk over an end of the vent tube on the outside of the chamber.

18. The method of claim 13 wherein mounting the vent tube in the chamber comprises:
mounting a bottom half of the vent tube in the chamber;
passing the at least one conductor across the bottom half of the vent tube; and
mounting a top half of the vent tube in the chamber over the at least one conductor and the bottom half of the vent tube.

19. The method of claim 13 wherein covering the chamber with the cover comprises screwing the cover onto the chamber.

20. The method of claim 13 wherein putting the sealing compound in the chamber comprises:
injecting the sealing compound into the chamber through a nozzle in the cover;
placing a plug over the nozzle; and
allowing the sealing compound to expand and harden.

* * * * *